United States Patent
Watanabe

(10) Patent No.: US 10,564,392 B2
(45) Date of Patent: Feb. 18, 2020

(54) IMAGING APPARATUS AND FOCUS CONTROL METHOD

(71) Applicant: FUJIFILM Corporation, Tokyo (JP)

(72) Inventor: Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/138,578

(22) Filed: Sep. 21, 2018

(65) Prior Publication Data
US 2019/0025544 A1 Jan. 24, 2019

Related U.S. Application Data

(63) Continuation of application No. PCT/JP2017/008142, filed on Mar. 1, 2017.

(30) Foreign Application Priority Data

Mar. 30, 2016 (JP) .................. 2016-068792

(51) Int. Cl.
G02B 7/36 (2006.01)
G03B 13/36 (2006.01)
(Continued)

(52) U.S. Cl.
CPC .............. *G02B 7/36* (2013.01); *G03B 13/36* (2013.01); *G03B 17/00* (2013.01); *H04N 5/23212* (2013.01); *G03B 15/006* (2013.01)

(58) Field of Classification Search
CPC ... G02B 7/36; G02B 7/38; G02B 7/40; H04N 5/23212; H04N 13/239; H04N 5/232123;
(Continued)

(56) References Cited

U.S. PATENT DOCUMENTS

| | | | | | |
|---|---|---|---|---|---|
| 2013/0162784 | A1* | 6/2013 | Ueda | .................. | H04N 5/23212 348/49 |
| 2016/0173756 | A1* | 6/2016 | Umezawa | .............. | G02B 7/102 348/345 |
| 2016/0255266 | A1* | 9/2016 | Nakagata | ........... | H04N 5/23212 348/241 |

FOREIGN PATENT DOCUMENTS

JP 2001-304855 A 10/2001
JP 2009-115893 A 5/2009
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2017/008142, dated Oct. 11, 2018, with English translation.
(Continued)

*Primary Examiner* — Lin Ye
*Assistant Examiner* — Chan T Nguyen
(74) *Attorney, Agent, or Firm* — Birch, Stewart, Kolasch & Birch, LLP

(57) ABSTRACT

An imaging apparatus includes: a distance measurement unit that measures distance values of a plurality of points in a first area which has a focus point as a reference point; a statistical unit that calculates statistics indicating a variation in the measured distance values of the plurality of points in the first area; a size determination unit that determines the size of a second area which has the focus point as a reference point, on the basis of the calculated statistics; a contrast evaluation value calculation unit that calculates a contrast evaluation value on the basis of an image of the second area; and a focusing unit that moves a focus lens to a lens position determined on the basis of the calculated contrast evaluation value.

11 Claims, 15 Drawing Sheets

(51) Int. Cl.
      *G03B 17/00*      (2006.01)
      *H04N 5/232*      (2006.01)
      *G03B 15/00*      (2006.01)

(58) Field of Classification Search
      CPC .. H04N 5/232127; G03B 13/36; G03B 17/00;
                    G03B 15/006; G03B 33/10; G03B 13/20
      USPC .......................................................... 348/345
      See application file for complete search history.

(56) References Cited

FOREIGN PATENT DOCUMENTS

| | | |
|---|---|---|
| JP | 2013-130827 A | 7/2013 |
| JP | 2013-148788 A | 8/2013 |
| JP | 2014-123069 A | 7/2014 |
| JP | 2014-138290 A | 7/2014 |
| JP | 2014-215506 A | 11/2014 |

OTHER PUBLICATIONS

International Search Report (Form PCT/ISA/210) for International Application No. PCT/JP2017/008142, dated May 16, 2017, with English translation.

\* cited by examiner

IMAGING APPARATUS AND FOCUS CONTROL METHOD

CROSS-REFERENCE TO RELATED APPLICATIONS

The present application is a Continuation of PCT International Application No. PCT/JP2017/008142 filed on Mar. 1, 2017 claiming priority under 35 U.S.C § 119(a) to Japanese Patent Application No. 2016-068792 filed on Mar. 30, 2016. Each of the above applications is hereby expressly incorporated by reference, in their entirety, into the present application.

BACKGROUND OF THE INVENTION

1. Field of the Invention

The present invention relates to an imaging apparatus and a focus control method that can appropriately focus on a desired portion of an object regardless of whether the object has a complex shape or a simple shape.

2. Description of the Related Art

In the related art, in contrast autofocus (AF) which searches for a focus lens position where the contrast of the image is the maximum and performs focusing, in a case in which a plurality of object images with different distances are present in a contrast evaluation focus area (referred to as a "focus area") of the image, a perspective conflict problem that it is difficult for a near-side object image to be appropriately in focus due to the influence of a far-side object image occurs between a plurality of objects. Various techniques for solving the perspective conflict problem have been provided.

JP2001-304855A discloses a technique that detects the face of a person and preferentially measures the distance to a detection area to reliably bring the face of the person into focus.

JP2014-123069A discloses a technique that performs first scanning which moves a focus lens at a high speed in a wide range from infinity to the closest focusing distance to acquire a peak position (peak position acquisition scanning) to detect a perspective conflict between a plurality of objects and performs second scanning (matching scanning) which moves the focus lens at a low speed in a narrow range having the peak position of a close object or the face as the center to reacquire the peak position in a case in which the perspective conflict is detected. In a case in which the face is detected, it is possible to change a distance measurement area depending on the size of the face.

JP2009-115893A discloses a technique which detects a perspective conflict between a plurality of objects in a contrast evaluation area including a plurality of phase difference detection areas, using an imaging element including a phase difference detection pixel group, and changes the contrast evaluation area such that it includes the phase difference detection areas of the closest object and the second closest object and does not include other phase difference detection areas in a case in which the perspective conflict is detected.

JP2014-215506A discloses a technique which detects a perspective conflict between a plurality of objects in a distance detection area, using a stereo camera, changes the distance detection area such that it includes only the objects at the same distance in a case in which the perspective conflict is detected, and performs an image recovery process such that the contrast of the distance detection area is the maximum.

SUMMARY OF THE INVENTION

However, it is difficult to appropriately bring a desired portion of the object into focus regardless of whether the object has a complex shape or a simple shape.

In the techniques disclosed in JP2001-304855A and JP2014-123069A, it is possible to detect the face and to bring the face into focus. However, it is difficult to appropriately bring an object other than the face into focus. That is, the contour of a specific object or the shape of components (for example, the eyes, nose, and mouth of a person) and a detection algorithm are stored in advance and it is possible to detect the specific object on the basis of the stored information and to bring the specific object into focus. However, it is not practical to store the shape of all objects and all detection algorithms in advance. Therefore, it is difficult to appropriately bring a desired portion of any object into focus.

In addition, in the techniques disclosed in JP2014-123069A and JP2009-115893A, in a case in which an image of an object having a complex shape that is extremely uneven as illustrated in FIG. 19 is captured and a portion of non-interest 94 with high contrast is located in front of a portion of interest 92 that is desired to be captured at a high resolution in a depth direction, the portion of non-interest 94 is in focus and the portion of interest 92 behind the portion of non-interest 94 in the depth direction is out of focus.

In addition, in a case in which an image of an object having a flat shape illustrated in FIG. 20 is captured, it is necessary to widen a focus area in order to avoid the influence of the reflection of, for example, illumination light and to appropriately perform contrast evaluation.

In the technique disclosed in JP2014-215506A, in a case in which a portion of non-interest is located in front of a portion of interest that is desired to be captured at a high resolution in the depth direction, an image recovery process is performed such that the contrast of the portion of non-interest is the maximum. However, the image recovery process is unlikely to be appropriately performed for the portion of interest behind the portion of non-interest in the depth direction. In addition, since contrast AF is not performed, for example, an image that enables a user to appropriately recognize microdamage (for example, a fine crack or fissure with a width of about 0.1 mm) occurring in a concrete material and steel is unlikely to be obtained.

The invention has been made in view of the above-mentioned problems and an object of the invention is to provide an imaging apparatus and a focus control method that can appropriately focus on a desired portion of an object regardless of whether the object has a complex shape or a simple shape.

In order to achieve the object, according to a first aspect of the invention, there is provided an imaging apparatus comprising: an imaging unit that captures an image of an object through an optical system including a focus lens; a distance measurement unit that measures distance values of a plurality of points in a first area which is in the captured image and has a focus point as a reference point; a statistical unit that calculates statistics indicating a variation in the measured distance values of the plurality of points in the first area; a size determination unit that determines a size of a second area which is used to calculate a contrast evaluation value in the image and has the focus point as a reference point, on the basis of the calculated statistics; a contrast evaluation value calculation unit that calculates the contrast evaluation value at each of a plurality of lens positions, on the basis of an image of the second area in an image captured by moving the focus lens to each of the plurality of lens positions; and a focusing unit that moves the focus lens to a lens position determined on the basis of the calculated contrast evaluation value.

According to this aspect, the size of the second area having the focus point as the reference point is determined on the basis of a variation in the distance values in the first area having the focus point as the reference point and a contrast value is calculated on the basis of the image of the second area. Therefore, it is possible to appropriately bring a desired portion of the object into focus in any of a case in which an image of an object having a complex shape is captured, a case in which an image of an object having a relatively simple and non-flat shape is captured, and a case in which an image of an object having a flat shape is captured.

According to a second aspect of the invention, in the imaging apparatus, the size determination unit reduces the size of the second area as the variation indicated by the statistics increases. According to this aspect, the size of the second area is determined according to the degree of complexity of the shape of the object. Therefore, it is possible to appropriately bring the object into focus according to the degree of complexity of the shape of the object.

According to a third aspect of the invention, in the imaging apparatus, the size determination unit increases the size of the second area as the variation indicated by the statistics is reduced. According to this aspect, the size of the second area is determined on the basis of the degree of simplicity of the shape of the object. Therefore, it is possible to appropriately bring the object into focus according to the degree of simplicity of the shape of the object.

According to a fourth aspect of the invention, in the imaging apparatus, the statistical unit calculates, as the statistics, a variance or standard deviation of the distance values of the plurality of points in the first area.

According to a fifth aspect of the invention, in the imaging apparatus, the statistical unit calculates the statistics on the basis of any one of a mean of the distance values in the first area, a mode of the distance values in the first area, and a distance value of a flat surface in the first area among the distance values of the plurality of points.

According to a sixth aspect of the invention, in the imaging apparatus, the contrast evaluation value calculation unit evaluates contrast in the second area that has a focus point indicated by an input command or the vicinity of the focus point as a center.

According to a seventh aspect of the invention, the imaging apparatus further comprises an area determination unit that determines an exclusion area to be excluded from the second area in the first area on the basis of the distance values of the plurality of points in the first area. According to this aspect, it is possible to bring the object into focus with higher accuracy.

According to an eighth aspect of the invention, the imaging apparatus further comprises an imaging direction control unit that controls an imaging direction of the imaging unit to at least one of a pan direction, a tilt direction, or a roll direction. The imaging direction control unit controls the imaging direction of the imaging unit on the basis of the focus point.

According to a ninth aspect of the invention, in the imaging apparatus, the distance measurement unit is a stereo camera that performs distance measurement using a stereo image or an optical distance measurement device that performs distance measurement using light.

According to a tenth aspect of the invention, in the imaging apparatus, the imaging unit captures an image of a structure to be inspected and an input command indicating a main inspection portion of the structure to be inspected as the focus point is received.

According to an eleventh aspect of the invention, there is provided a focus control method comprising: a step of measuring distance values of a plurality of points in a first area which is in an image of an object captured by an imaging unit through an optical system including a focus lens and has a focus point as a reference point; a step of calculating statistics indicating a variation in the measured distance values of the plurality of points in the first area; a step of determining a size of a second area which is used to calculate a contrast evaluation value in the image and has the focus point as a reference point, on the basis of the calculated statistics; a step of calculating the contrast evaluation value at each of a plurality of lens positions, on the basis of an image of the second area in an image captured by moving the focus lens to each of the plurality of lens positions; and a step of moving the focus lens to a lens position determined on the basis of the calculated contrast evaluation value.

According to the invention, it is possible to appropriately bring a desired portion of an object into focus regardless of whether the object has a complex shape or a simple shape.

DESCRIPTION OF THE PREFERRED EMBODIMENTS

Hereinafter, an imaging apparatus and a focus control method according to the invention will be described with reference to the accompanying drawings.

First Embodiment

Figure 1:
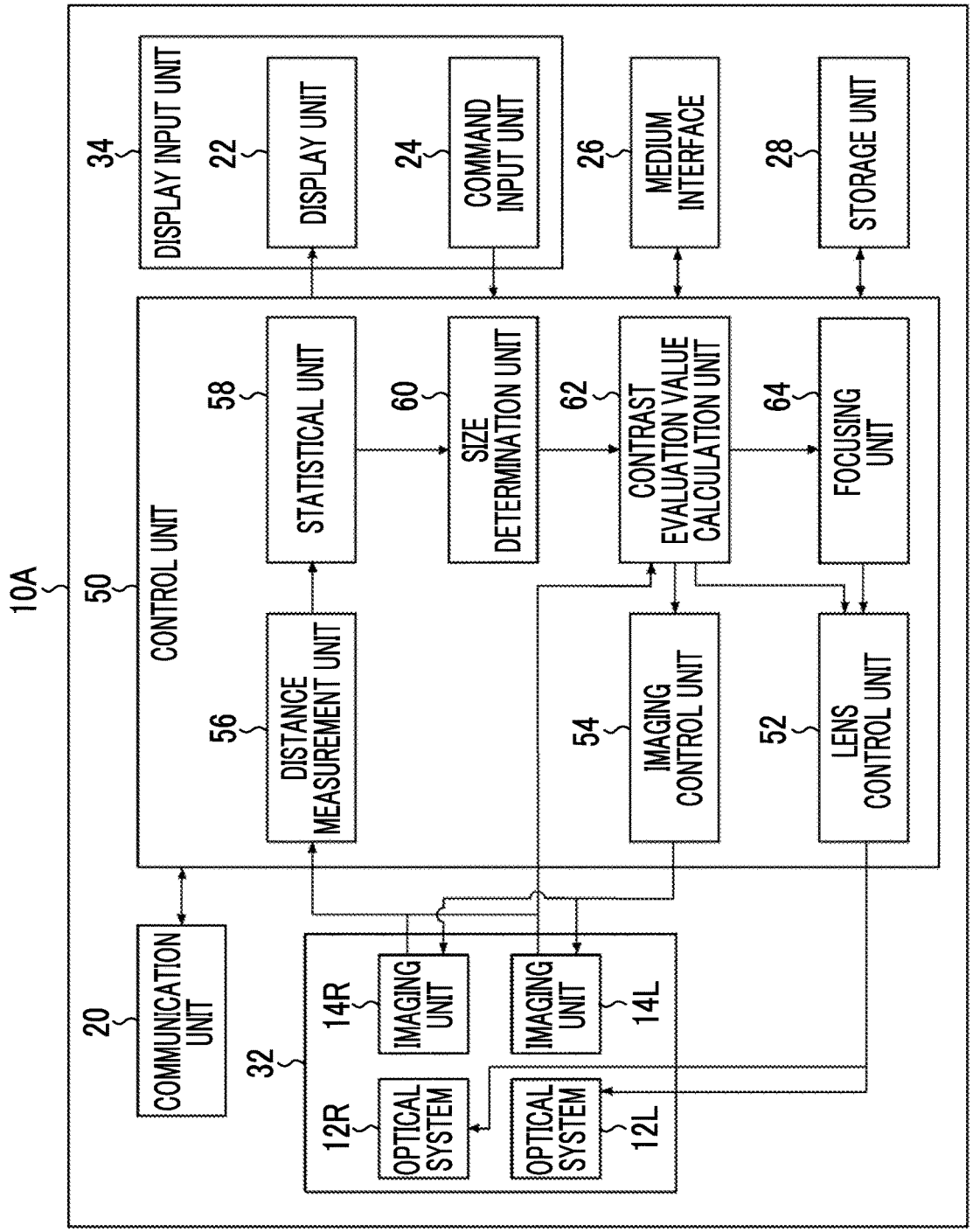
FIG. 1 is a block diagram illustrating an example of the configuration of an imaging apparatus according to a first embodiment.

FIG. 1 is a block diagram illustrating an example of the configuration of an imaging apparatus according to a first embodiment.

An imaging apparatus 10A illustrated in FIG. 1 includes an optical system (a first optical system 12R and a second optical system 12L) including a focus lens, an imaging unit (a first imaging unit 14R and a second imaging unit 14L) that captures an image of an object through the optical systems 12R and 12L, a communication unit 20 that communicates with an apparatus outside the imaging apparatus 10A, a display unit 22 that can display an image, a command input unit 24 that receives a command input from a user, a medium interface 26 that is an interface with a recording medium on which images can be recorded, a storage unit 28 that stores a program and information required to execute the program, and a control unit 50 that controls each unit of the imaging apparatus 10A according to the program stored in the storage unit 28.

A stereo camera 32 includes the optical systems 12R and 12L and the imaging units 14R and 14L. The stereo camera 32 can capture the images of the same object from a plurality of viewpoints and acquire a multi-viewpoint image (three-dimensional image). The first optical system 12R and the first imaging unit 14R acquire a first viewpoint image and the second optical system 12L and the second imaging unit 14L acquire a second viewpoint image.

The communication unit 20 is a wired or wireless communication device.

The display unit 22 and the command input unit 24 form a display input unit 34. The display input unit 34 according to this example is a so-called touch panel display in which the display unit 22 displays an image and the command input unit 24 detects a touch operation of the user for the image. The display unit 22 is a display device such as a liquid crystal display (LCD). An organic light emitting diode (OLED) display may be used. The command input unit 24 is a pointing device that is provided on a screen of the display unit 22 so as to cover the screen of the display unit 22 and can detect a touch position. However, the command input unit 24 may include a keyboard and a mouse. In addition, other input devices, such as a voice input device and a gesture input device, may be used.

The medium interface 26 is, for example, an input/output device that performs a recording process and a reading process for a memory card.

The storage unit 28 includes, for example, a read only memory (ROM), a random access memory (RAM), and an electrically erasable programmable read only memory (EEPROM). Other storage devices may be used.

The control unit 50 is, for example, a central processing unit (CPU).

The control unit 50 includes a lens control unit 52 that controls the lens positions and F-numbers of the optical systems 12R and 12L, an imaging control unit 54 that controls the imaging units 14R and 14L, a distance measurement unit 56 that measures distance values of a plurality of points in a basic focus area (hereinafter, also referred to as a "first area") having a focus point as a reference point in the image obtained by the imaging units 14R and 14L, a statistical unit 58 that calculates statistics indicating a variation in the measured distance values of the plurality of points in the basic focus area (first area), a size determination unit 60 that determines the size of a contrast evaluation focus area (hereinafter, also referred to as a "second area") having the focus point as a reference point on the basis of the calculated statistics, a contrast evaluation value calculation unit 62 that calculates a contrast evaluation value at each lens position on the basis of an image of the contrast evaluation focus area (second area) in the image captured by moving the focus lenses of the optical systems 12R and 12L to each of the plurality of lens positions, and a focusing unit 64 that moves the focus lenses of the optical systems 12R and 12L to the lens position determined on the basis of the calculated contrast evaluation value.

The distance measurement unit 56 according to this example calculates the distance values of a plurality of points in the basic focus area (first area) on the basis of the first viewpoint image of the object captured by the first imaging unit 14R and the second viewpoint image of the object captured by the second imaging unit 14L and generates a distance image.

The statistical unit 58 according to this example calculates the variance (or the standard deviation) of a plurality of distance values in the basic focus area (first area) as the statistics indicating a variation in the distance values.

The size determination unit 60 according to this example reduces the size of the contrast evaluation focus area (second area) as the variation in the distance values indicated by the statistics increases. In addition, the size determination unit 60 according to this example increases the size of the contrast evaluation focus area (second area) as the variation in the distance values indicated by the statistics is reduced.

The contrast evaluation value calculation unit 62 according to this example acquires a contrast evaluation image by directing the lens control unit 52 to move the focus lens of at least one of a plurality of optical systems 12R and 12L and directing the imaging control unit 54 to control the imaging operation of at least one of a plurality of imaging units 14R and 14L, and calculates a contrast evaluation value in the contrast evaluation focus area (second area) of the image.

The focusing unit 64 according to this example moves the focus lens to the lens position where the contrast evaluation value is the maximum among a plurality of lens positions of the focus lens, using the lens control unit 52. The focusing unit 64 according to this example moves the focus lens of each of the plurality of optical systems 12R and 12L on the basis of the contrast evaluation value for the image obtained by from at least one of the plurality of imaging units 14R and 14L.

Figure 2:
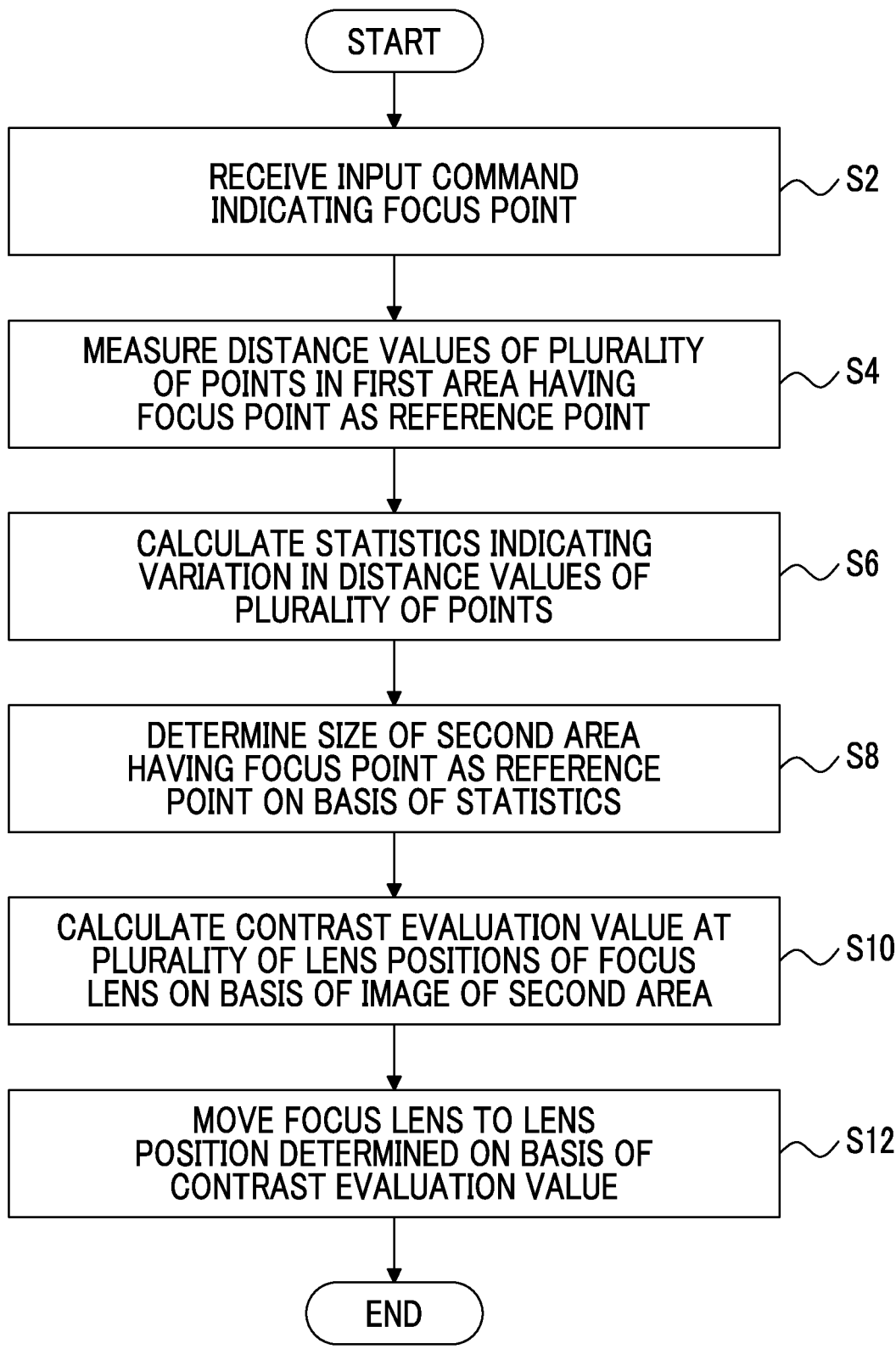
FIG. 2 is a flowchart illustrating the flow of an example of a focus control process according to the first embodiment.

FIG. 2 is a flowchart illustrating the flow of an example of a focus control process according to the first embodiment (an example of a focus control method according to the invention).

In this example, the image of a structure (for example, a bridge or a building) which is an inspection target is captured by the imaging units 14R and 14L of the stereo camera 32. The deterioration of a structure can be determined from the degree of damage such as cracks, fissures, or corrosion. Examples of an inspection portion which is an imaging target include a welded portion of steel and the surface of a concrete material. For example, microdamage with a width of about 0.1 mm, such as a crack or a fissure, is important. It is important to appropriately perform focusing in order to appropriately determine the degree of microdamage.

First, the command input unit 24 receives an input command indicating a focus point (Step S2). In this example, the command input unit 24 receives an input command indicating a main inspection portion of the structure to be inspected as the focus point.

Figure 3:
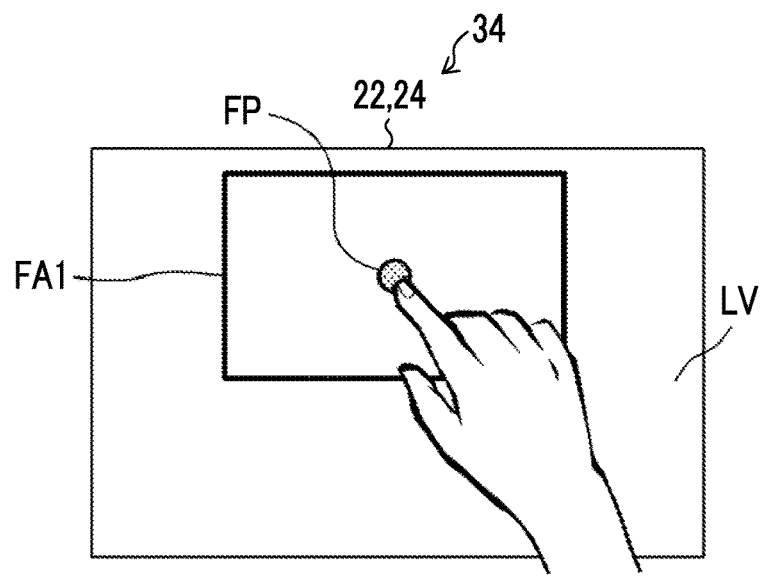
FIG. 3 is a diagram illustrating an example of the input of a command indicating a focus point in the first embodiment.

As illustrated in FIG. 3, the display unit 22 according to this example displays a live view motion picture LV which is a motion picture that is being captured by the imaging unit 14R or 14L. A position in the live view motion picture LV which corresponds to a position on a screen of the display unit 22 touched by, for example, a finger is recognized to be at a focus point FP. That is, the command input unit 24 according to this example converts the coordinates of a command input position (touch position) in a coordinate system on the screen of the display unit 22 into the coordinates of the focus point FP in the coordinate system of the image.

Then, the distance measurement unit 56 measures the distance values of a plurality of points in the basic focus area (first area FA1) having the focus point FP as a reference point (Step S4). In this example, the basic focus area is a focus area with a basic size having the focus point FP as the center. The basic size is, for example, a predetermined percentage (for example, 30% of the screen) of the area of the screen of the display unit 22.

The distance measurement unit 56 according to this example calculates the distance values of a plurality of points in the basic focus area (FA1 in FIG. 3) on the basis of the first viewpoint image of the object captured by the first imaging unit 14R and the second viewpoint image of the object captured by the second imaging unit 14L. First, the distance measurement unit 56 according to this example detects corresponding points between the first viewpoint image obtained by the first imaging unit 14R and the second viewpoint image obtained by the second imaging unit 14L, calculates the amount of parallax at each corresponding point, and generates a distance image indicating the distance values of the plurality of points from the amount of parallax.

Then, the statistical unit 58 calculates statistics indicating a variation in the distance values of the plurality of points in the basic focus area (first area FA1) on the basis of the measured distance values of the plurality of points (Step S6).

The statistical unit 58 according to this example calculates a variance (or a standard deviation) on the basis of any one of the mean of the distance values, the mode of the distance values, and a distance value of a flat surface among the distance values of the plurality of points in the basic focus area (first area FA1). The "flat surface" is a surface with a flat shape such as a wall surface, and the "distance value of the flat surface" is a value indicating the distance to the "flat surface".

Then, the size determination unit 60 determines the size of the contrast evaluation area (second area FA2) having the focus point as a reference point, on the basis of the calculated statistics (Step S8). In this example, the second area FA2 is an area that has, as the center, the focus point FP corresponding to the command input through the command input unit 24. The second area FA2 may be an area that has, as the center, the vicinity of the focus point FP corresponding to the command input through the command input unit 24.

Figure 4:
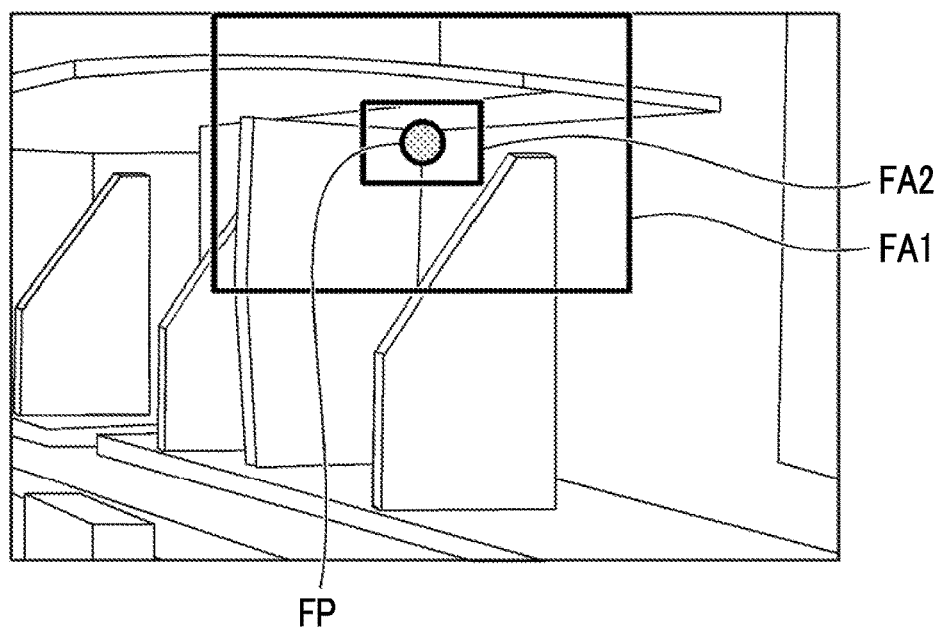
FIG. 4 is a diagram illustrating an example of a focus point, a first area, and a second area of an object having a complex shape.
Figure 5:
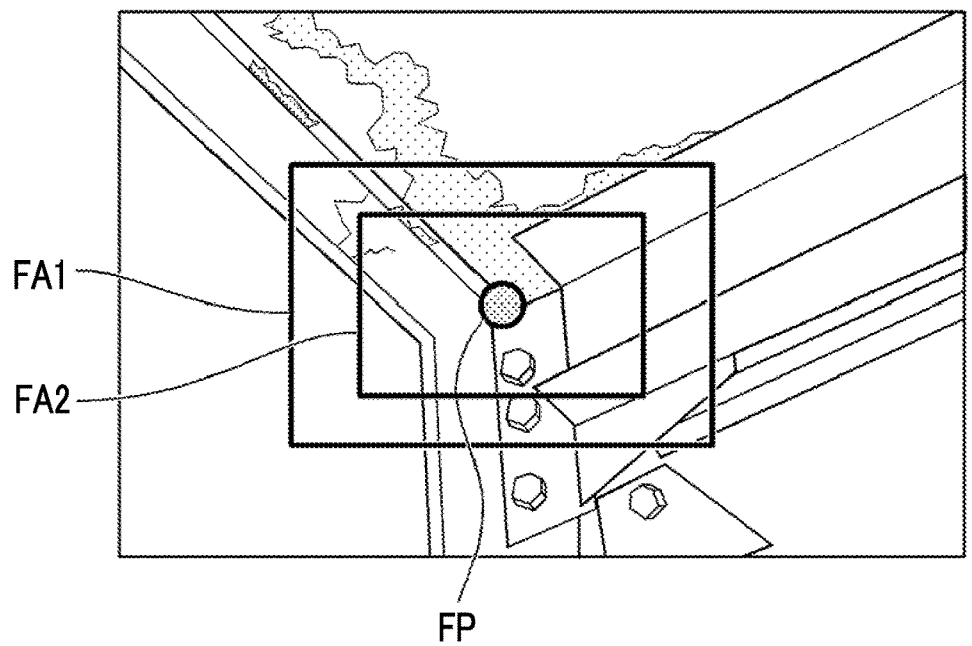
FIG. 5 is a diagram illustrating an example of a focus point, a first area, and a second area of an object having a relatively simple and non-flat shape.
Figure 6:
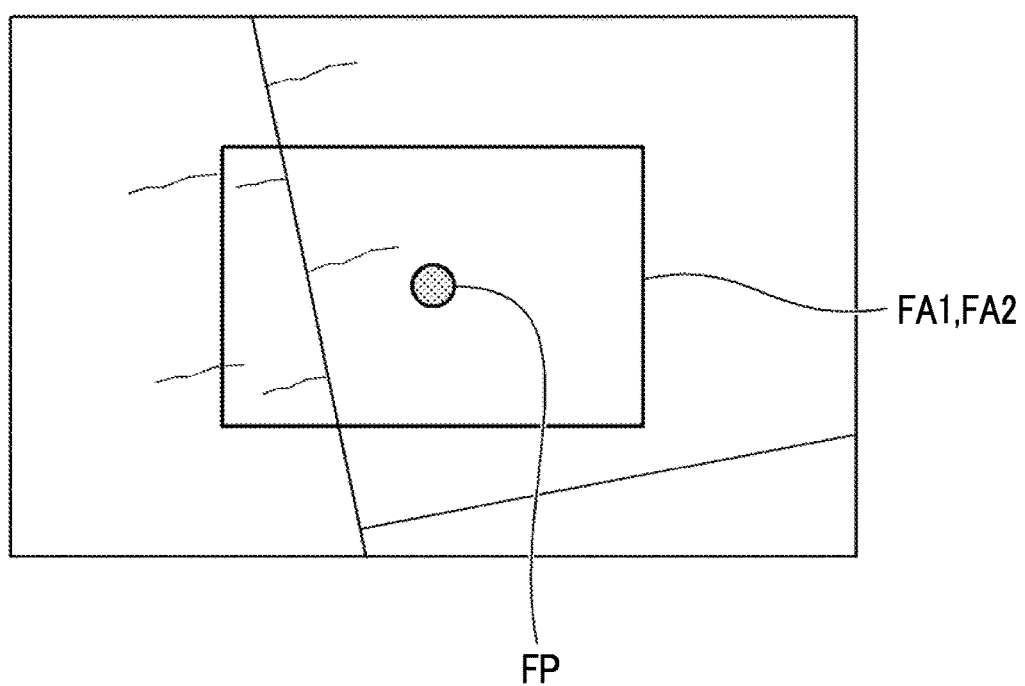
FIG. 6 is a diagram illustrating an example of a focus point, a first area, and a second area of an object having a flat shape.

FIG. 4 illustrates an example of the focus point FP, the first area FA1, and the second area FA2 of an object with a complex shape. FIG. 5 illustrates an example of the focus point FP, the first area FA1, and the second area FA2 of an object with a relatively simple and non-flat shape. FIG. 6 illustrates an example of the focus point FP, the first area FA1, and the second area FA2 of an object with a flat shape.

Figure 7:
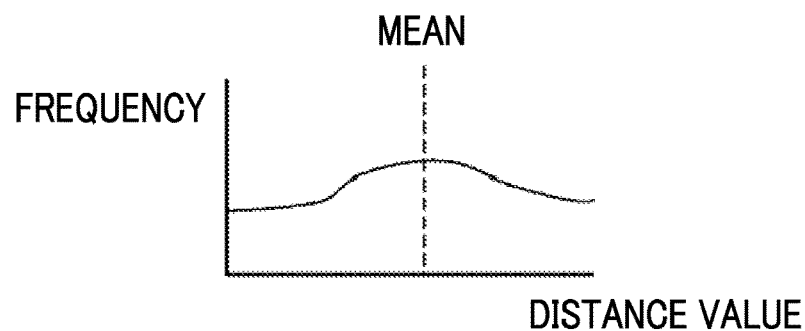
FIG. 7 is a graph illustrating an example of a variation in a distance value in the object having a complex shape illustrated in FIG. 4.
Figure 8:
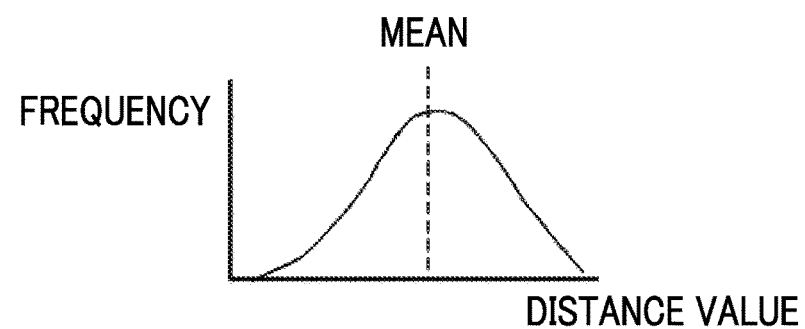
FIG. 8 is a graph illustrating an example of a variation in a distance value in the object having a relatively simple and non-flat shape illustrated in FIG. 5.
Figure 9:
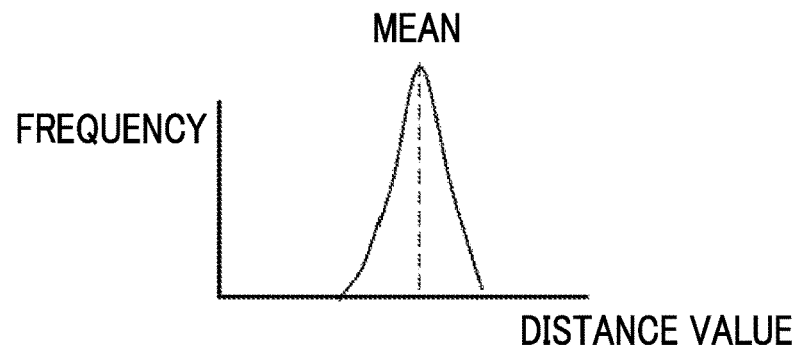
FIG. 9 is a graph illustrating an example of a variation in a distance value in the object having a flat shape illustrated in FIG. 6.

FIG. 7 is a graph illustrating a variation in the distance value in the object with a complex shape illustrated in FIG. 4. FIG. 8 is a graph illustrating a variation in the distance value in the object with a relatively simple and non-flat shape illustrated in FIG. 5. FIG. 9 is a graph illustrating a variation in the distance value in the object with a flat shape illustrated in FIG. 6. For example, the statistical unit 58 according to this example calculates, as the statistics, a variance $\sigma^2$ (or a standard deviation a) indicating a variation (dispersion) in the distance value based on the mean of the distance values. As illustrated in FIGS. 4 and 7, the size determination unit 60 according to this example reduces the size of the second area FA2 as the variation indicated by the statistics increases. Therefore, even in a case in which a welded portion (inspection target) with a flat shape is interposed between the portions with complex shapes as illustrated in FIG. 4, it is possible to set the second area FA2 with a size that is capable of appropriately determining contrast corresponding to the welded portion. In addition, the size determination unit 60 according to this example increases the size of the second area FA2 as the variation indicated by the statistics is reduced as illustrated in FIGS. 5, 6, 8, and 9. Therefore, for both the inspection target with a relatively simple and non-flat shape illustrated in FIG. 5 and the inspection target with a flat shape illustrated in FIG. 6, it is possible to set the second area FA2 with an appropriate size corresponding to the degree of simplicity of the inspection target. The size of the first area FA1 is, for example, 30% of the screen size of the display unit 22. The size of the second area FA2 illustrated in FIG. 4 is, for example, 2% of the screen size of the display unit 22. The size of the second area FA2 illustrated in FIG. 5 is, for example, 10% of the screen size of the display unit 22. The size of the second area FA2 illustrated in FIG. 6 is equal to the size of the first area FA1. However, the size of the second area FA2 is not limited to the sizes illustrated in FIGS. 4 to 6 and may be determined according to statistics.

Then, the contrast evaluation value calculation unit 62 calculates the contrast evaluation value at each lens position on the basis of the image (partial image) of the contrast evaluation focus area (second area FA2) in the image (entire image) captured at each of a plurality of lens positions of the focus lens (Step S10).

Then, the focusing unit 64 determines a lens position (focal position) where the contrast evaluation value is the maximum from the plurality of lens positions and moves the focus lens to the determined lens position (Step S12).

In the first embodiment, the integrated imaging apparatus in which the stereo camera 32, the control unit 50, and the display input unit 34 are integrally formed has been described as an example. However, the invention is not limited thereto.

Second Embodiment

In a second embodiment, a detachable imaging apparatus in which a stereo camera 32 can be remotely operated will be described as an example.

Figure 10:
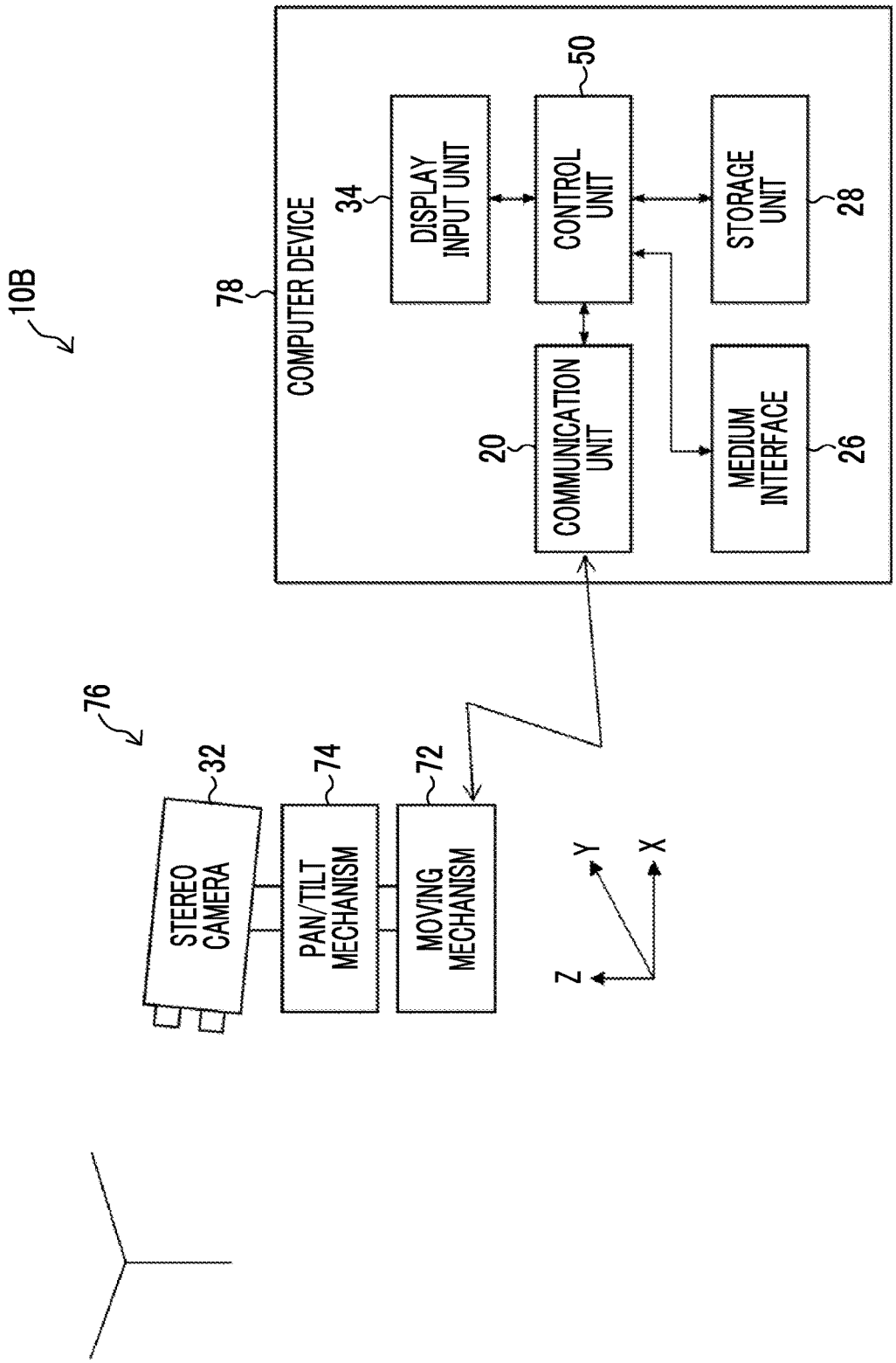
FIG. 10 is a block diagram illustrating an example of the configuration of an imaging apparatus according to a second embodiment.

FIG. 10 is a block diagram illustrating an example of the configuration of an imaging apparatus according to the second embodiment. The same components as those in the imaging apparatus according to the first embodiment illustrated in FIG. 1 are denoted by the same reference numerals and the description of the content that has been described will not be repeated.

An imaging apparatus 10B illustrated in FIG. 10 includes a stereo camera (which is the same as the stereo camera 32 according to the first embodiment illustrated in FIG. 1), a moving mechanism 72 that can move the stereo camera 32 in three directions (the X direction, the Y direction, and the Z direction perpendicular to each other), a pan/tilt mechanism 74 (which is an aspect of an "imaging direction control unit" according to the invention) that can change the imaging direction of the stereo camera 32 to a pan direction and a tilt direction, and a computer device 78 that remotely controls the stereo camera 32, the moving mechanism 72, and the pan/tilt mechanism 74. In this example, the pan/tilt mechanism 74 that can control the imaging direction to the pan direction and the tilt direction is used as the "imaging direction control unit". However, a mechanism that can control the imaging direction to a roll direction may be used. In addition, a mechanism that controls the imaging direction to at least one of the pan direction, the tilt direction, or the roll direction may be used as the "imaging direction control unit". The stereo camera 32, the moving mechanism 72, and the pan/tilt mechanism 74 form a moving body 76 to be remotely controlled. The moving body 76 is, for example, a "robot".

Examples of the computer device 78 include a tablet computer and a smart phone. The user can remotely input commands related to the position of the stereo camera 32, the imaging direction, a focus point, and imaging conditions using the computer device 78.

The computer device 78 according to this example includes the communication unit 20, the display input unit 34 (the display unit 22 and the command input unit 24), the medium interface 26, the storage unit 28, and the control unit 50 illustrated in FIG. 1. The communication unit 20 can wirelessly communicate with the moving body 76. The communication unit 20 may perform wired communication. In addition, the moving body 76 may be provided with some or all of the components (the lens control unit 52, the imaging control unit 54, the distance measurement unit 56, the statistical unit 58, the size determination unit 60, the contrast evaluation value calculation unit 62, and the focusing unit 64) of the control unit 50 illustrated in FIG. 1.

Figure 11:
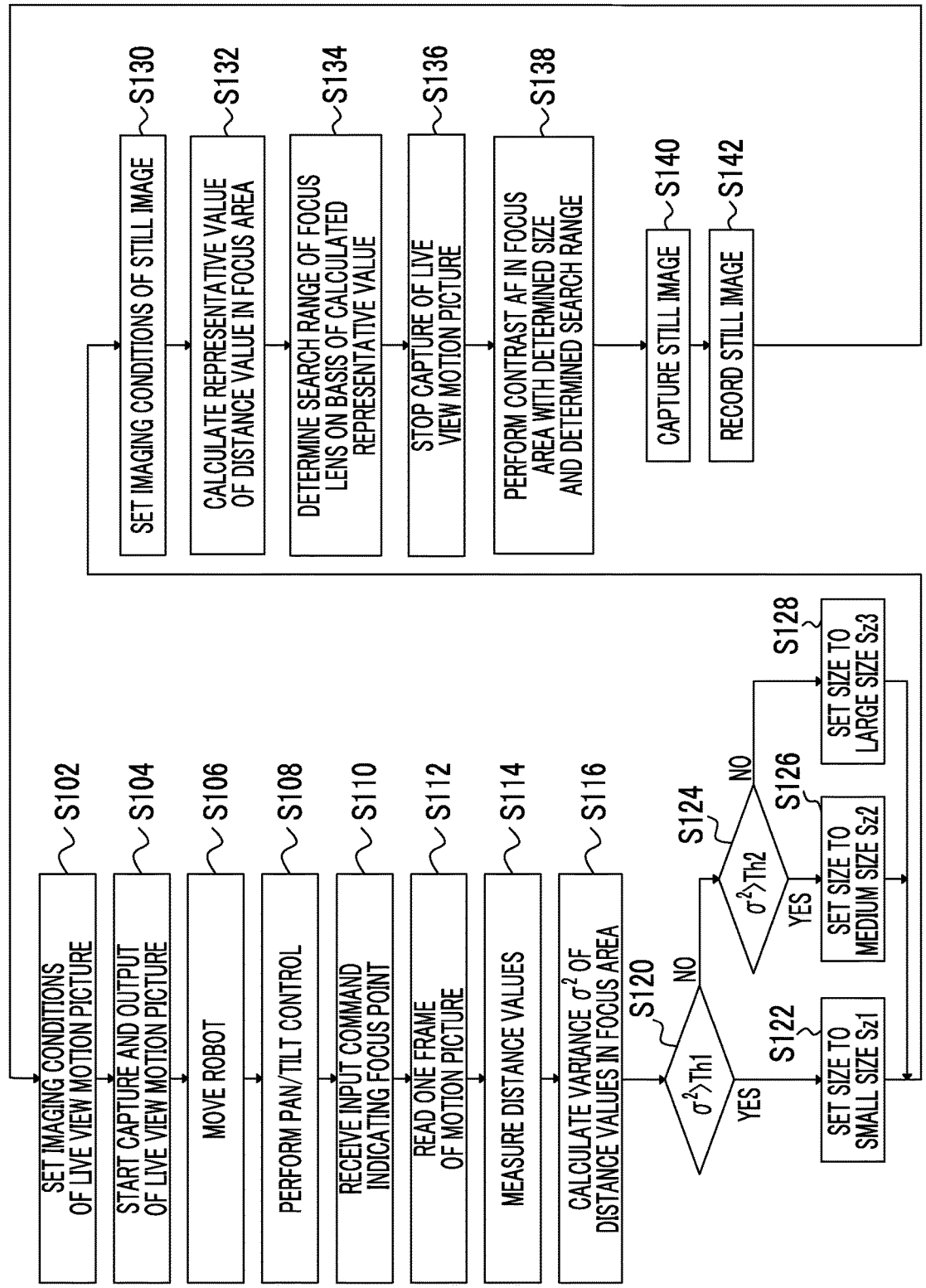
FIG. 11 is a flowchart illustrating the flow of an example of a focus control process according to the second embodiment.

FIG. 11 is a flowchart illustrating the flow of an example of a focus control process according to the second embodiment. The control unit 50 of the computer device 78 performs the focus control process according to the program stored in the storage unit 28.

First, the imaging control unit 54 of the control unit 50 sets the imaging conditions of a live view motion picture in the stereo camera 32 through the communication unit 20 (Step S102). The F-number (stop value) of the optical systems 12R and 12L of the stereo camera 32 is set to, for example, "F10". In the capture of a live view motion picture, the depth of field is greater than that in the capture of a still image, which will be described below, in order to check the distance distribution of the entire focus area.

Then, the imaging control unit 54 of the control unit 50 starts the capture of a live view motion picture by the stereo camera 32 and starts the output of the live view motion picture by the display unit 22 of the display input unit 34 (Step S104). For example, the live view motion picture is captured, transmitted, and output at a resolution of 1920× 1080 dots, at a rate of 60 fps (frames per second), and through two channels.

Then, the moving mechanism 72 moves the position of the stereo camera 32 in at least one of the X direction, the Y direction, or the Z direction in response to the command input from the user through the display input unit 34 if necessary (Step S106). That is, the moving mechanism 72 moves the moving body 76 (a robot in this example).

In addition, the pan/tilt mechanism 74 changes the imaging direction of the stereo camera 32 in at least one of the pan direction or the tilt direction in response to the command input from the user through the display input unit 34 if necessary (Step S108). That is, the pan/tilt mechanism 74 performs pan/tilt control for the stereo camera 32.

Figure 12:
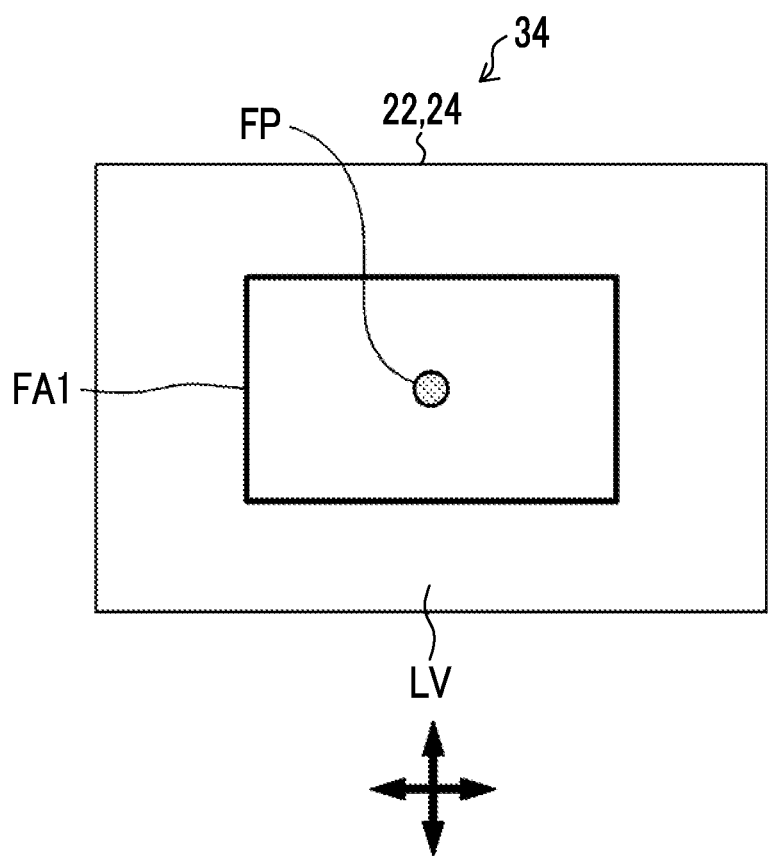
FIG. 12 is a diagram illustrating an example of the input of a command indicating a focus point in the second embodiment.

The display input unit 34 receives an input focus point command (Step S110). In this example, since the live view motion picture is displayed on the display input unit 34, the user can perform an operation of inputting a focus point command while seeing the live view motion picture. As illustrated in FIG. 12, in this example, the focus point FP is displayed at a position fixed to the center of the screen on the screen of the display unit 22. However, the moving mechanism 72 and the pan/tilt mechanism 74 are controlled by an operation for the command input unit 24 such that the position (imaging position) and imaging direction of the stereo camera 32 are changed and the live view motion picture LV is moved on the screen of the display unit 22. That is, the focus point FP is moved by an operation for the command input unit 24 in the real space in which the stereo camera 32 is present.

Then, the distance measurement unit 56 of the control unit 50 acquires one frame image of the live view motion picture in order to measure a distance value (Step S112). Since the stereo camera 32 outputs two-system motion pictures (two-viewpoint motion pictures) with different viewpoints, the distance measurement unit 56 acquires frame images (stereo images) captured from two viewpoints at the same time.

Then, the distance measurement unit 56 of the control unit 50 measures the distance values of a plurality of points in the basic focus area (first area) of the frame image (Step S114).

Then, the statistical unit 58 of the control unit 50 calculates the variance $\sigma^2$ of the distance values of the plurality of points in the basic focus area (Step S116). In this example, the statistical unit 58 calculates the mean of the distance values of the plurality of points in the basic focus area and calculates the variance $\sigma^2$ of the distance values of the plurality of points in the basic focus area having the mean as the center.

Then, the size determination unit 60 of the control unit 50 determines the size of the contrast evaluation focus area (second area) on the basis of the variance $\sigma^2$ (Steps S120 to S128). In the drawings, threshold values (a first threshold value Th1 and a second threshold value Th2) satisfy the following relationship: Th1>Th2. In addition, in the drawings, the sizes of the focus area (a small size Sz1, a medium size Sz2, and a large size Sz3) satisfy the following relationship: Sz1<Sz2<Sz3.

In a case in which the calculated variance & is greater than the first threshold value Th1 (YES in Step S120), the size of the contrast evaluation focus area is determined to be the small size Sz1 (Step S122). For example, the screen size of the display input unit 34 is determined to be "10%".

In a case in which the calculated variance $\sigma^2$ is equal to or less than the first threshold value Th1 and is greater than the second threshold value Th2 (YES in Step S124), the size of the contrast evaluation focus area is determined to be the medium size Sz2 (Step S126). For example, the screen size of the display input unit 34 is determined to be "20%".

In a case in which the calculated variance $\sigma^2$ is equal to or less than the second threshold value Th2 (NO in Step S124), the size of the contrast evaluation focus area is determined to be the large size Sz3 (Step S128). For example, the screen size of the display input unit 34 is determined to be "30%".

Then, the imaging control unit 54 of the control unit 50 sets the imaging conditions of a still image in the stereo camera 32 through the communication unit 20 (Step S130). For example, aperture and exposure are set to "auto". In the capture of a still image, the F-number is set to the minimum value or a value (for example, "F4") close to the minimum value to reduce the depth of field to be less than that in the capture of the live view motion picture. In addition, the exposure time is shorter than that in the capture of the live view motion picture. That is, the imaging conditions are set such that a contrast evaluation value can be acquired with high accuracy and image blur caused by vibration can be prevented.

Then, the statistical unit 58 calculates a representative value (for example, a mean, a mode, or a distance value of a flat surface) of the distance values in the basic focus area (first area) (Step S132).

Then, the contrast evaluation value calculation unit 62 of the control unit 50 determines the search range of the focal position of the focus lens on the basis of the calculated representative value (Step S134). That is, the moving range of the lens position of the focus lens is determined. In addition, the interval at which the lens position of the focus lens is moved may be determined.

Then, the imaging control unit 54 of the control unit 50 performs control such that the capture of the live view motion picture by the stereo camera 32 is stopped (Step S136).

Then, the contrast evaluation value calculation unit 62 and the focusing unit 64 perform contrast autofocus (AF) with the determined size (the size determined in Steps S120 to S128) and in the determined search range (the search range determined in Step S134) (Step S138). The contrast evaluation value calculation unit 62 directs the lens control unit 52 to move the focus lens in the optical system (at least one of the optical system 12R or the optical system 12L) of the stereo camera 32 in the determined search range and directs the imaging control unit 54 to perform control such that the imaging unit (at least one of the imaging unit 14R or the imaging unit 14L) of the stereo camera 32 captures an image. In addition, the contrast evaluation value calculation unit 62 calculates the contrast evaluation value of the contrast evaluation focus area (second area) in the image captured by the stereo camera 32 at each lens position of the focus lens and determines the lens position of the focus lens where the contrast evaluation value is the maximum as the focal position. The focusing unit 64 directs the lens control unit 52 to move the lens position of the focus lens of the stereo camera 32 to the determined focal position.

Then, the imaging control unit 54 of the control unit 50 directs the stereo camera 32 to capture a still image (Step S140).

Then, the still image captured by the stereo camera 32 is stored (recorded) in the storage unit 28 (Step S142). The still image may be stored (recorded) in a recording medium (for example, a memory card) by the medium interface 26. In addition, the still image may be transmitted to an external apparatus through the communication unit 20.

The case in which the robot is used as the moving mechanism 72 has been described. However, the invention is not limited to the above-mentioned example. For example, an unmanned aerial vehicle (UAV) which is called a "drone" may be used as the moving mechanism 72. That is, the pan/tilt mechanism 74 and the stereo camera 32 can be provided in the unmanned aerial vehicle to form the moving body 76. The pan/tilt mechanism 74 may be omitted.

In the first and second embodiments, the case in which the distance values of a plurality of points are calculated on the basis of the two-viewpoint image captured by the stereo camera 32 has been described as an example. However, the invention is not limited thereto.

Third Embodiment

In a third embodiment, distance measurement is performed in a time-of-flight (TOF) manner.

Figure 13:
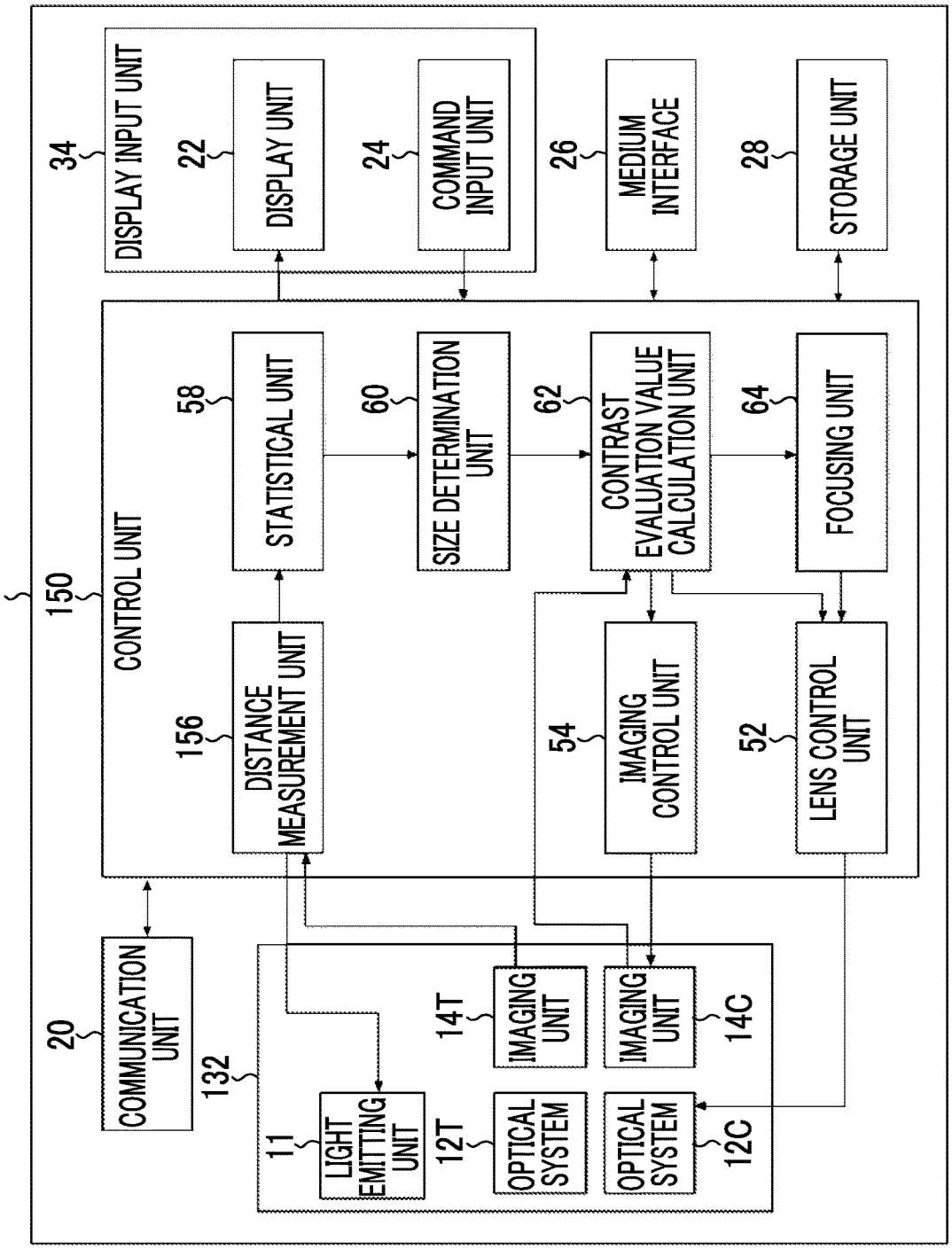
FIG. 13 is a block diagram illustrating an example of the configuration of an imaging apparatus according to a third embodiment.

FIG. 13 is a block diagram illustrating an example of the configuration of an imaging apparatus 10C according to the third embodiment. The same components as those in the imaging apparatus 10A according to the first embodiment illustrated in FIG. 1 are denoted by the same reference numerals and the description of the content that has been described will not be repeated.

In FIG. 13, light which has been emitted from a light emitting unit 11 and then reflected from an object is guided to a light receiving surface of an imaging unit 14T for distance measurement by an optical system 12T for distance measurement. The light emitting unit 11 is, for example, an infrared light emitting diode (LED) that emits infrared light. The optical system 12T for distance measurement includes a lens that guides light reflected from the object to the light receiving surface of the imaging unit 14T for distance measurement. The imaging unit 14T for distance measurement is, for example, a CMOS image sensor or a CCD image sensor. Distance measurement may be performed using a laser range finder. An optical system 12C for color imaging includes a focus lens. An imaging unit 14C for color imaging captures an image of the object through the optical system 12C for color imaging.

The light emitting unit 11, the optical system 12T, and the imaging unit 14T for distance measurement and the optical system 12C and the imaging unit 14C for color imaging form a TOF camera 132. The light emitting unit 11, the optical system 12T, and the imaging unit 14T for distance measurement are an aspect of an optical distance measurement device according to the invention.

A control unit 150 is, for example, a CPU and includes a distance measurement unit 156 that performs distance measurement in a TOF manner. The distance measurement unit 156 according to this embodiment acquires the distance values of a plurality of points corresponding to the flight time of light from the emission of the light from the light emitting unit 11 to the reception of the light by the imaging unit 14T for distance measurement on the basis of the imaging result of the imaging unit 14T for distance measurement.

A focus control process of the imaging apparatus 10C according to this example is the same as the focus control process according to the first embodiment described with reference to FIG. 2. However, in the measurement of the distance values (Step S4 in FIG. 2), the distance values of a plurality of points are calculated in the TOF manner on the basis of the imaging result of the imaging unit 14T for distance measurement in the TOF camera 132.

In the third embodiment, the integrated imaging apparatus in which the TOF camera 132, the control unit 50, and the display input unit 34 are integrally formed have been described as an example. However, the invention is not limited thereto.

Fourth Embodiment

In a fourth embodiment, a detachable imaging apparatus in which the TOF camera 132 can be remotely operated will be described as an example.

Figure 14:
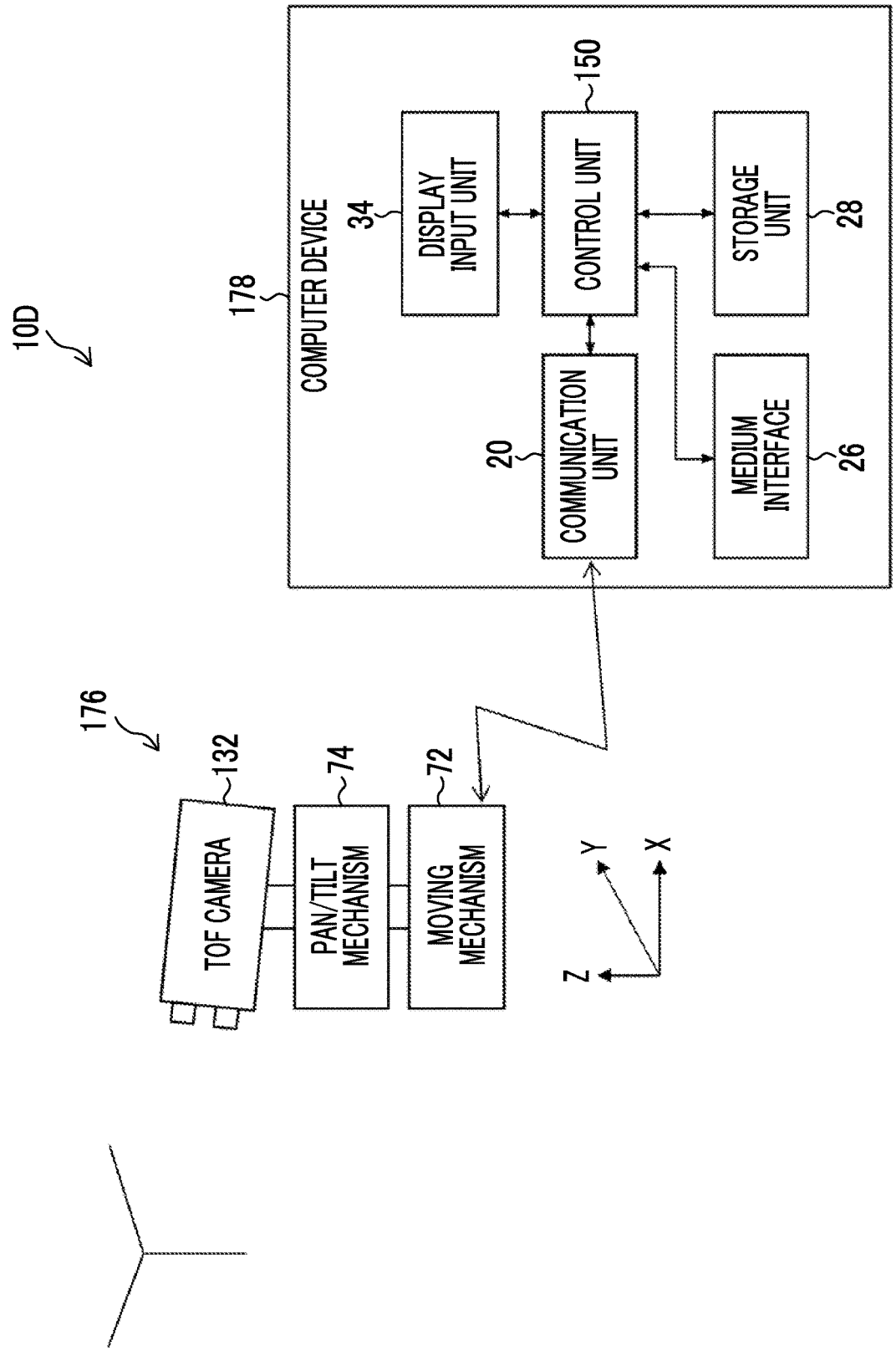
FIG. 14 is a block diagram illustrating an example of the configuration of an imaging apparatus according to a fourth embodiment.

FIG. 14 is a block diagram illustrating an example of the configuration of an imaging apparatus according to the fourth embodiment. The same components as those in the imaging apparatus 10A according to the first embodiment illustrated in FIG. 1, the imaging apparatus 10B according to the second embodiment illustrated in FIG. 10, and the imaging apparatus 10C according to the third embodiment illustrated in FIG. 13 are denoted by the same reference numerals and the description of the content that has been described will not be repeated.

An imaging apparatus 10D illustrated in FIG. 14 includes a moving mechanism 72 that can move the TOF camera 132 in three directions (the X direction, the Y direction, and the Z direction perpendicular to each other), a pan/tilt mechanism 74 (which is an aspect of an "imaging direction control unit" according to the invention) that can change the imaging direction of the TOF camera 132 to the pan direction and the tilt direction, and a computer device 178 that remotely controls the TOF camera 132, the moving mechanism 72, and the pan/tilt mechanism 74. In addition, a mechanism that controls the imaging direction to at least one of the pan direction, the tilt direction, or the roll direction may be used as the "imaging direction control unit". The TOF camera 132, the moving mechanism 72, and the pan/tilt mechanism 74 form a moving body 176 to be remotely controlled. The moving body 176 is, for example, a "robot".

Examples of the computer device 178 include a tablet computer and a smart phone. The user can remotely input commands related to the position, imaging direction, focus point, and imaging conditions of the TOF camera 132 using the computer device 178. In addition, some or all of the components (the lens control unit 52, the imaging control unit 54, the distance measurement unit 156, the statistical unit 58, the size determination unit 60, the contrast evaluation value calculation unit 62, and the focusing unit 64) of the control unit 150 illustrated in FIG. 13 may be provided in the moving body 176.

For example, an unmanned aerial vehicle (UAV) which is called a "drone" may be used as the moving mechanism 72. That is, the pan/tilt mechanism 74 and the TOF camera 132 can be provided in the unmanned aerial vehicle to form the moving body 176. The pan/tilt mechanism 74 may be omitted.

A focus control process of the imaging apparatus 10D according to this example is the same as the focus control process according to the second embodiment described with reference to FIG. 11. However, in the measurement of the distance values (Step S114 in FIG. 11), the distance values of a plurality of points are calculated in the TOF manner on the basis of the imaging result of the imaging unit 14T for distance measurement in the TOF camera 132.

Fifth Embodiment

Figure 15:
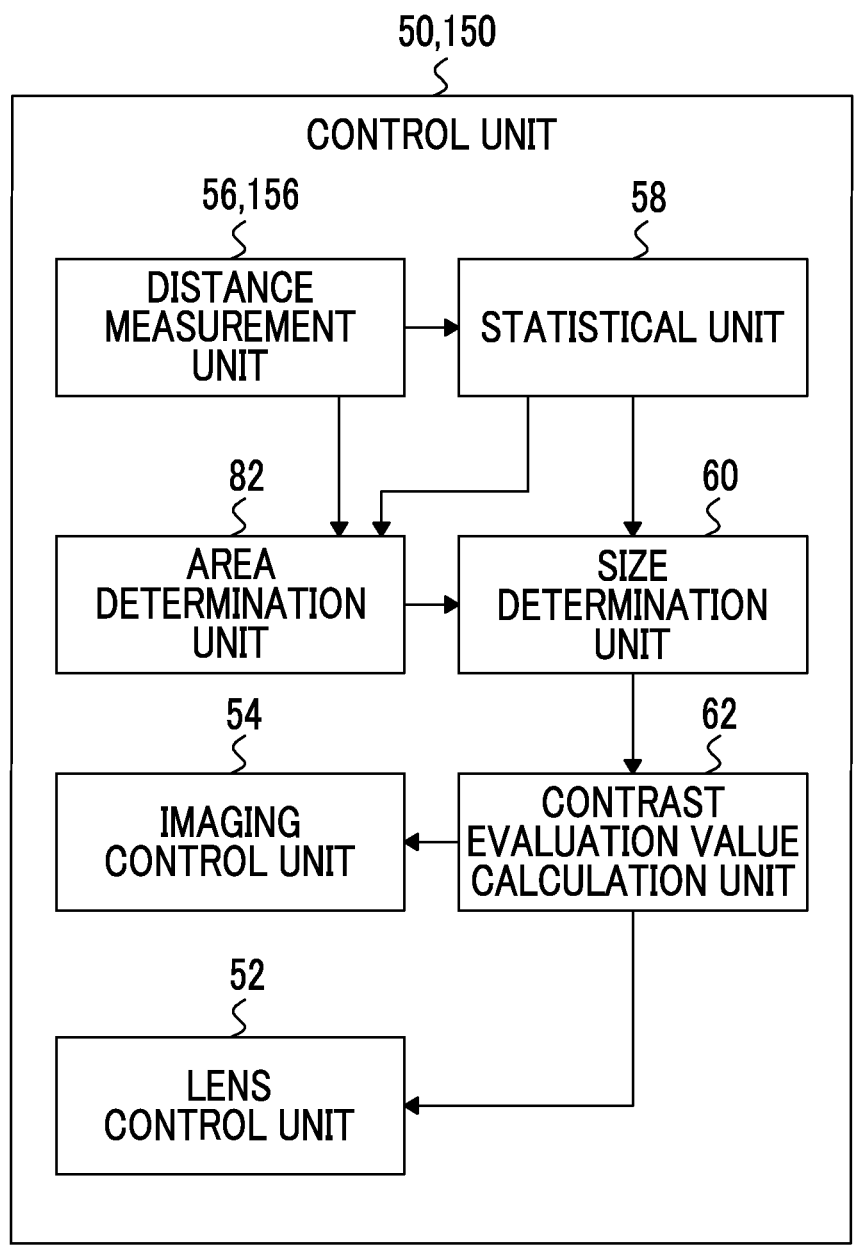
FIG. 15 is a block diagram illustrating an example of the configuration of an imaging apparatus according to a fifth embodiment.

FIG. 15 is a block diagram illustrating an example of the configuration of a main portion of an imaging apparatus according to a fifth embodiment.

A control unit 50 (or 150) according to this embodiment includes an area determination unit 82 that determines an exclusion area to be excluded from a contrast evaluation focus area (second area) in a basic focus area (first area) on the basis of the measurement results of the distance values of a plurality of points in the basic focus area.

The control unit 50 (or 150) according to this embodiment can be replaced with the control units 50 (or 150) according to the first to fourth embodiments.

Figure 16:
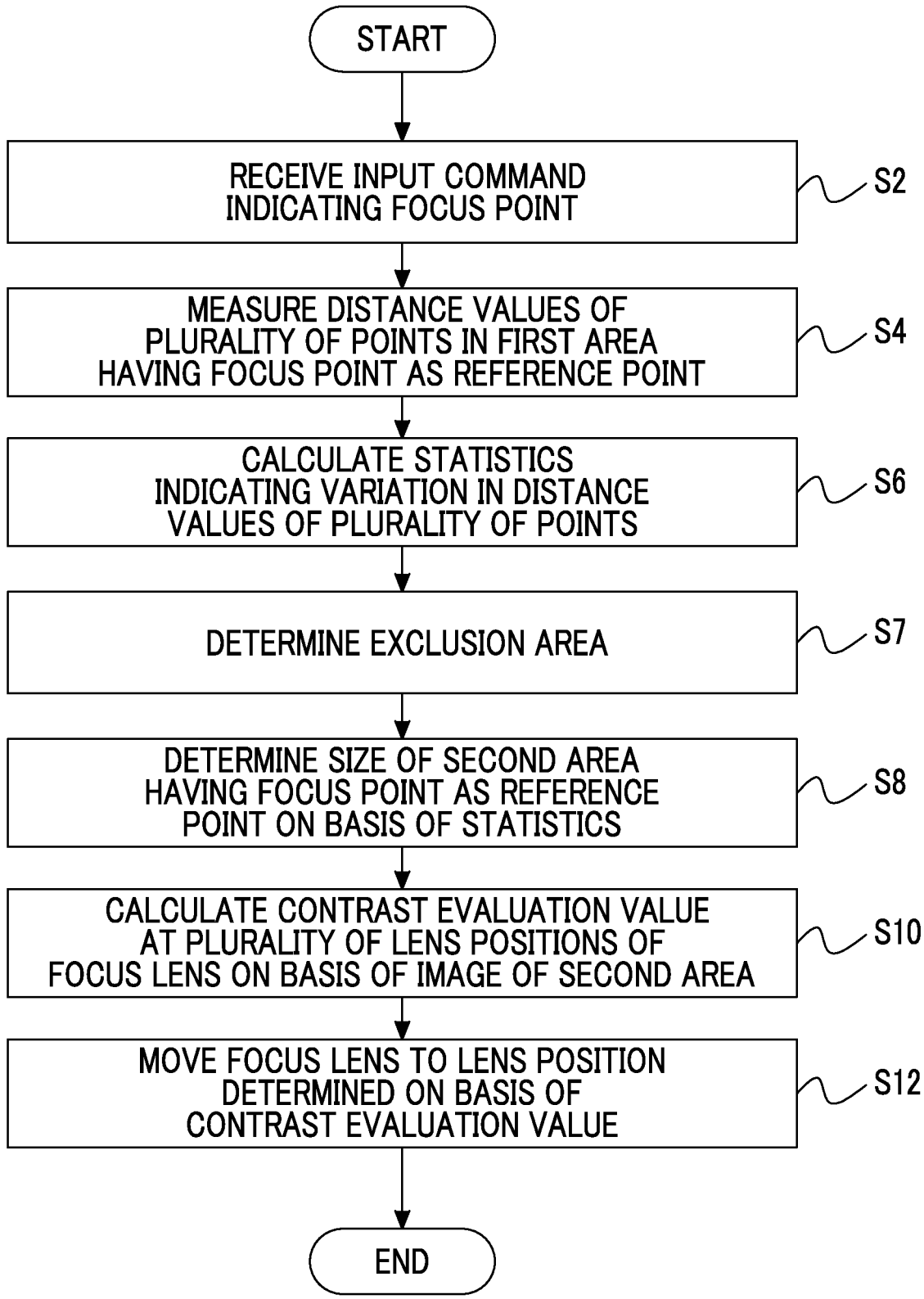
FIG. 16 is a flowchart illustrating the flow of an example of a focus control process according to the fifth embodiment.

FIG. 16 is a flowchart illustrating the flow of an example of a focus control process according to the fifth embodiment. The same steps as those in the example of the focus control process according to the first embodiment illustrated in FIG. 2 are denoted by the same reference numerals and the description of the content that has been described will not be repeated.

In this embodiment, the exclusion area to be excluded from the contrast evaluation focus area (second area) in the basic focus area (first area) is determined on the basis of the measurement results of the distance values of a plurality of points in the basic focus area (Step S7).

In Step S8, the size determination unit 60 sets an area obtained by excluding the exclusion area from the basic focus area (first area) as the contrast evaluation focus area (second area) and determines the size of the contrast evaluation focus area.

There are various aspects in the determination of the exclusion area by the area determination unit 82. Hereinafter, an example of the determination of the exclusion area will be described.

In a first aspect, the distance values of a plurality of points are compared with the mean or mode of the distance values in the first area and an area in which the difference between the distance values is equal to or greater than a threshold value is determined to be the exclusion area.

In a second aspect, an area in which the distance values of a plurality of points are not continuous with the focus point is determined to be the exclusion area. That is, the continuity of the distance values in the vicinity of the focus point is determined and an area in which the distance value jumps by a predetermined value or more is determined to be the exclusion area.

[Example of Configuration of Smart Phone]

Figure 17:
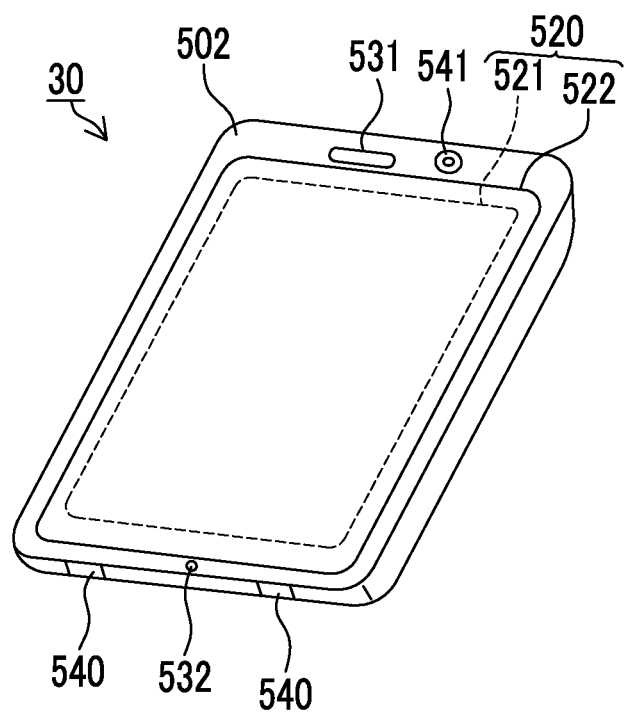
FIG. 17 is a diagram illustrating the outward appearance of a smart phone.

FIG. 17 illustrates the outward appearance of a smart phone 30 which is an example of the imaging apparatus and the computer device. The smart phone 30 illustrated in FIG. 17 includes a housing 502 with a flat panel shape. The smart phone 30 includes a display input unit 520 having a display panel 521 as a display unit and an operation panel 522 as an input unit which are integrally formed on one surface of the housing 502. The housing 502 includes a speaker 531, a microphone 532, an operation unit 540, and a camera unit 541. However, the configuration of the housing 502 is not limited thereto. For example, the display unit and the input unit may be independently provided or the housing 502 may have a folding structure or a sliding mechanism.

Figure 18:
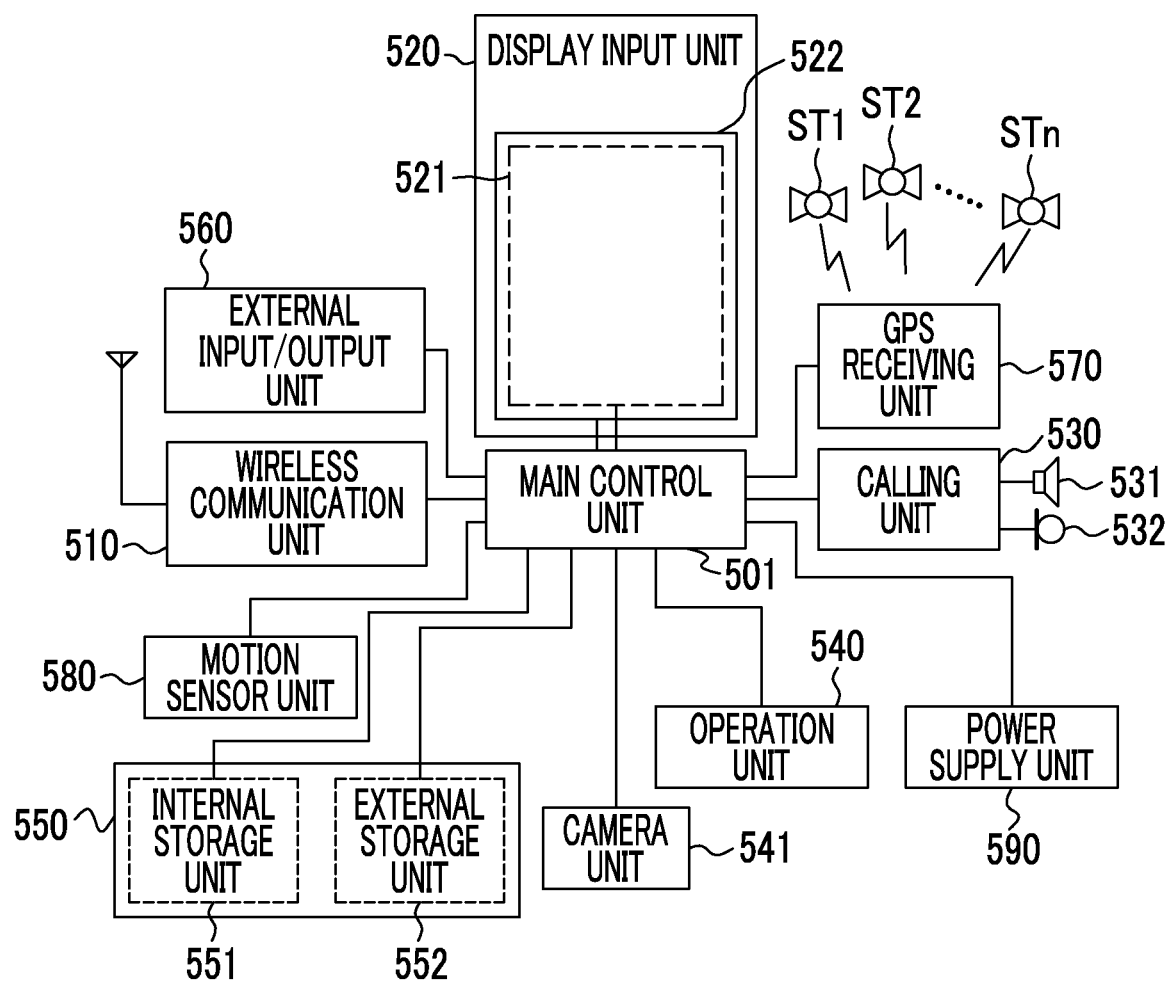
FIG. 18 is a block diagram illustrating an example of the configuration of the smart phone illustrated in FIG. 17.
Figure 19:
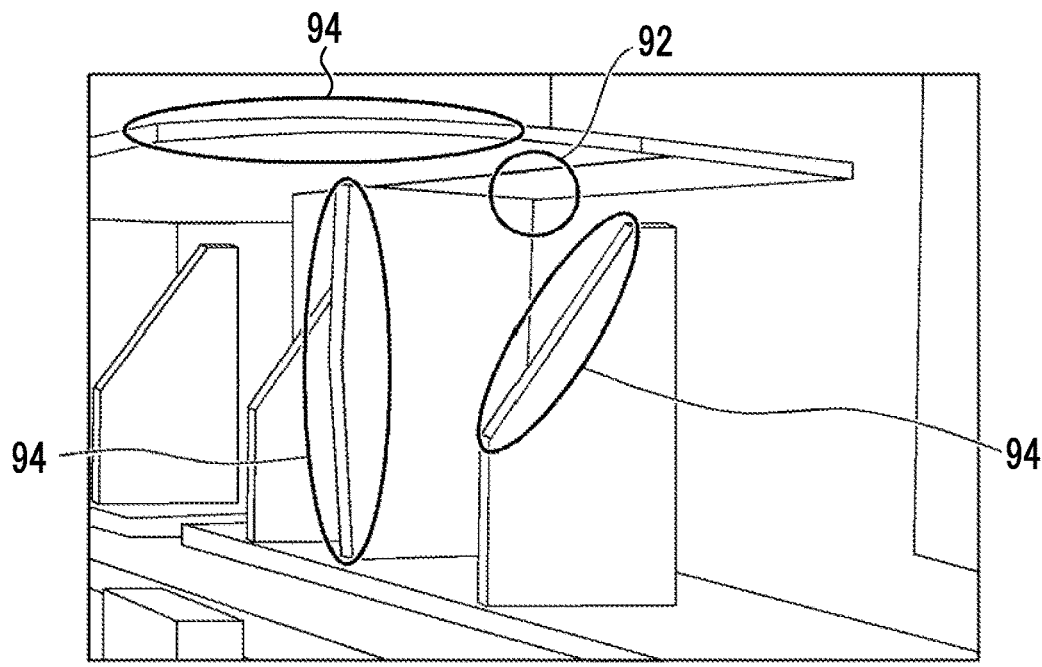
FIG. 19 is a first diagram illustrating the problems to be solved by the invention.
Figure 20:
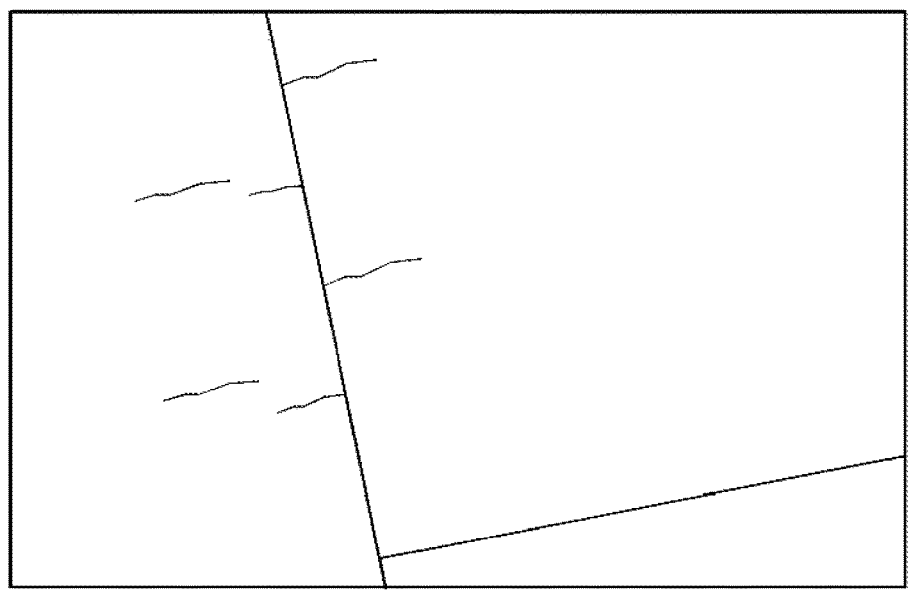
FIG. 20 is a second diagram illustrating the problems to be solved by the invention.

FIG. 18 is a block diagram illustrating an example of the configuration of the smart phone 30 illustrated in FIG. 17. As illustrated in FIG. 18, the smart phone 30 includes, as main components, a wireless communication unit 510, the display input unit 520, a calling unit 530, the operation unit 540, the camera unit 541, a storage unit 550, an external input/output unit 560, a global positioning system (GPS) receiving unit 570, a motion sensor unit 580, a power supply unit 590, and a main control unit 501. In addition, the smart phone 30 has, as a main function, a wireless communication function which performs mobile wireless communication through a base station apparatus and a mobile communication network.

The wireless communication unit 510 performs wireless communication with the base station apparatus which is accommodated in the mobile communication network in response to a command from the main control unit 501. The wireless communication is used to transmit and receive various types of file data, such as voice data and image data, and electronic mail data or to receive, for example, web data or streaming data.

The display input unit 520 is a so-called touch panel that displays, for example, images (still images and motion pictures) or text information to visually transmit information to the user and detects the user's operation for the displayed information under the control of the main control unit 501 and includes the display panel 521 and the operation panel 522.

The display panel 521 uses, for example, a liquid crystal display (LCD) or an organic light emitting diode (OELD) display as a display device. The operation panel 522 is a device that is provided such that an image displayed on a display surface of the display panel 521 can be visually recognized and detects one or a plurality of coordinate points operated by a finger of the user or a pen-type input device. In a case in which the device is operated by a finger of the user or a pen-type input device, the operation panel 522 outputs a detection signal which is generated by the operation to the main control unit 501. Then, the main control unit 501 detects an operation position (coordinates) on the display panel 521 on the basis of the received detection signal.

As illustrated in FIG. 17, the display panel 521 and the operation panel 522 of the smart phone 30 are integrated to form the display input unit 520 and the operation panel 522 is provided so as to completely cover the display panel 521. In a case in which this arrangement is used, the operation panel 522 may have a function of detecting the user's operation even in an area other than the display panel 521. In other words, the operation panel 522 may include a detection area (hereinafter, referred to as a display area) for an overlap portion which overlaps the display panel 521 and a detection area (hereinafter, referred to as a non-display area) for an outer edge portion which does not overlap the display panel 521.

The size of the display area may be exactly equal to the size of the display panel 521. However, the sizes are not necessarily equal to each other. The operation panel 522 may include two sensitive areas, that is, an outer edge portion and an inner portion other than the outer edge portion. The width of the outer edge portion is appropriately designed according to, for example, the size of the housing 502. Examples of a position detection method which is used in the operation panel 522 include a matrix switching method, a resistive film method, a surface elastic wave method, an infrared method, an electromagnetic induction method, and a capacitive method. Any of the methods may be used.

The calling unit 530 includes the speaker 531 and the microphone 532. The calling unit 530 converts the voice of the user which is input through the microphone 532 into voice data which can be processed by the main control unit 501 and outputs the converted voice data to the main control unit 501. In addition, the calling unit 530 decodes voice data received by the wireless communication unit 510 or the external input/output unit 560 and outputs the decoded voice data from the speaker 531. As illustrated in FIG. 17, for example, the speaker 531 can be mounted on the same surface as the display input unit 520 and the microphone 532 can be mounted on the side surface of the housing 502.

The operation unit 540 is a hardware key which uses, for example, a key switch and receives commands from the user. For example, as illustrated in FIG. 17, the operation unit 540 is a push button switch which is mounted on the side surface of the housing 502 of the smart phone 30, is turned on in a case in which it is pressed by, for example, a finger, and is turned off by the restoring force of a spring in a case in which the finger is taken off.

The storage unit 550 stores a control program or control data of the main control unit 501, application software, address data which is associated with, for example, the names or phone numbers of communication partners, transmitted and received electronic mail data, web data which is downloaded by web browsing, or downloaded content data. In addition, the storage unit 550 temporarily stores, for example, streaming data. The storage unit 550 includes an internal storage unit 551 which is provided in the smart phone and an external storage unit 552 which has a slot for a detachable external memory. Each of the internal storage unit 551 and the external storage unit 552 forming the storage unit 550 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 560 functions as an interface with all of the external apparatuses connected to the smart phone 30 and is directly or indirectly connected to other external apparatuses by communication (for example, universal serial bus (USB) communication) or a network (for example, the Internet, a wireless local area network (LAN), a Bluetooth (registered trademark) network, a radio frequency identification (RFID) network, an Infrared Data Association (IrDA) (registered trademark) network, an Ultra Wideband (UWB) (registered trademark) network, or a ZigBee (registered trademark) network).

Examples of the external apparatus connected to the smart phone 30 include a wired/wireless headset, a wired/wireless external charger, a wired/wireless data port, a memory card or a subscriber identity module (SIM)/user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a personal digital assistant (PDA) which is connected wirelessly or in a wired manner, and an earphone. The external input/output unit may transmit data received from the external apparatus to each component of the smart phone 30 or may transmit data in the smart phone 30 to the external apparatus.

The GPS receiving unit 570 receives GPS signals transmitted from GPS satellites ST1 to STn and performs a position measurement process on the basis of a plurality of received GPS signals to detect a position including the latitude, longitude, and height of the smart phone 30, in response to a command from the main control unit 501. In a case in which the GPS receiving unit 570 can acquire positional information from the wireless communication unit 510 or the external input/output unit 560 (for example, a wireless LAN), it can detect the position using the positional information.

The motion sensor unit 580 includes, for example, a triaxial acceleration sensor and detects the physical movement of the smart phone 30 in response to a command from the main control unit 501. The physical movement of the smart phone 30 is detected to detect the moving direction or acceleration of the smart phone 30. The detection result is output to the main control unit 501.

The power supply unit 590 supplies power accumulated in a battery (not illustrated) to each unit of the smart phone 30 in response to a command from the main control unit 501.

The main control unit 501 includes a microprocessor, operates on the basis of the control program or control data stored in the storage unit 550, and controls the overall operation of each unit of the smart phone 30. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays a video on the display input unit 520 on the basis of image data (still image data or motion picture data) such as received data or downloaded streaming data. The image processing function means the function of the main control unit 501 decoding the image data, performing image processing on the decoding result, and displaying the image on the display input unit 520.

In addition, the main control unit 501 performs display control for the display panel 521 and operation detection control for detecting the operation of the user through the operation unit 540 and the operation panel 522.

The main control unit 501 performs the display control to display a software key, such as an icon for running application software or a scroll bar, or to display a window for creating electronic mail. The scroll bar means a software key for receiving a command to move a displayed portion of an image that is too large to fit into the display area of the display panel 521.

The main control unit 501 performs the operation detection control to detect the operation of the user input through the operation unit 540, to receive an operation for the icon or the input of a character string to an input field of the window through the operation panel 522, or to receive a request to scroll the displayed image through the scroll bar.

In addition, the main control unit 501 has a touch panel control function that performs the operation detection control to determine whether the position of an operation for the operation panel 522 is an overlap portion (display area) which overlaps the display panel 521 or an outer edge portion (non-display area) which does not overlap the display panel 521 other than the overlap portion and controls a sensitive area of the operation panel 522 or the display position of the software key.

The main control unit 501 can detect a gesture operation for the operation panel 522 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 541 is a digital camera that electronically captures images using an imaging element such as a complementary metal oxide semiconductor (CMOS) image sensor or a charge coupled device (CCD) image sensor. In addition, the camera unit 541 can convert captured image data into image data compressed in, for example, a Joint Photographic Coding Experts Group (JPEG) format, record the image data on the storage unit 550, or output the image data through the external input/output unit 560 or the wireless communication unit 510, under the control of the main control unit 501. In the smart phone 30 illustrated in FIG. 17, the camera unit 541 is mounted on the same surface as the display input unit 520. However, the mounting position of the camera unit 541 is not limited thereto. For example, the camera unit 541 may be mounted on the rear surface of the display input unit 520. Alternatively, a plurality of camera units 541 may be mounted. In a case in which the plurality of camera units 541 are mounted, the camera units 541 used for imaging may be switched such that the independent camera unit 541 captures images or the plurality of camera units 541 may be used at the same time to capture images.

The camera unit 541 can be used for various functions of the smart phone 30. For example, the image acquired by the camera unit 541 may be displayed on the display panel 521 or the image acquired by the camera unit 541 may be used as one of the operation inputs of the operation panel 522. In a case in which the GPS receiving unit 570 detects the position, the position may be detected with reference to the image from the camera unit 541. In addition, the optical axis direction of the camera unit 541 in the smart phone 30 may be determined or the current usage environment may be determined, with reference to the image from the camera unit 541, using the triaxial acceleration sensor or without using the triaxial acceleration sensor. Of course, the image from the camera unit 541 may be used in the application software.

In addition, for example, the positional information acquired by the GPS receiving unit 570, the voice information acquired by the microphone 532 (for example, the voice information may be converted into text information by the main control unit), and the posture information acquired by the motion sensor unit 580 may be added to still image data or motion picture data and the image data may be recorded on the storage unit 550 or may be output through the external input/output unit 560 or the wireless communication unit 510.

The embodiments of the invention have been described above. However, the invention is not limited to the above-described embodiments and modification examples and various modifications and changes of the invention can be made without departing from the scope and spirit of the invention.

EXPLANATION OF REFERENCES 10A, 10B, 10C, 10D: imaging apparatus
11: light emitting unit
12C, 12L, 12R, 12T: optical system
14C, 14L, 14R, 14T: imaging unit
20: communication unit
22: display unit
24: command input unit
26: medium interface
28: storage unit
30: smart phone
32: stereo camera
34: display input unit
50: control unit
52: lens control unit
54: imaging control unit
56: distance measurement unit
58: statistical unit
60: size determination unit
62: contrast evaluation value calculation unit
64: focusing unit
72: moving mechanism
74: pan/tilt mechanism
76: moving body
78: computer device
82: area determination unit
92: portion of interest
94: portion of non-interest
132: TOF camera
150: control unit
156: distance measurement unit
178: computer device
501: main control unit
502: housing
510: wireless communication unit
520: display input unit
521: display panel
522: operation panel
530: calling unit
531: speaker
532: microphone
540: operation unit
541: camera unit
550: storage unit
551: internal storage unit
552: external storage unit
560: external input/output unit
570: receiving unit
570: GPS receiving unit
580: motion sensor unit
590: power supply unit
FA1: first area
FA2: second area
FP: focus point
LV: live view motion picture
ST1: GPS satellite
Sz1: small size
Sz2: medium size
Sz3: large size
Th1: first threshold value
Th2: second threshold value
σ: standard deviation
$\sigma^2$: variance

What is claimed is:

1. An imaging apparatus comprising:
an imaging unit that captures an image of an object through an optical system including a focus lens;
a distance measurement unit that measures distance values of a plurality of points in a first area which is in the captured image and has a focus point as a reference point;
a statistical unit that calculates statistics indicating a variation in the measured distance values of the plurality of points in the first area;
a size determination unit that determines a size of a second area which is used to calculate a contrast evaluation value in the image and has the focus point as a reference point, on the basis of the calculated statistics;
a contrast evaluation value calculation unit that calculates the contrast evaluation value at each of a plurality of lens positions, on the basis of an image of the second area in an image captured by moving the focus lens to each of the plurality of lens positions; and
a focusing unit that moves the focus lens to a lens position determined on the basis of the calculated contrast evaluation value.

2. The imaging apparatus according to claim 1,
wherein the size determination unit reduces the size of the second area as the variation indicated by the statistics increases.

3. The imaging apparatus according to claim 1,
wherein the size determination unit increases the size of the second area as the variation indicated by the statistics is reduced.

4. The imaging apparatus according to claim 1,
wherein the statistical unit calculates, as the statistics, a variance or standard deviation of the distance values of the plurality of points in the first area.

5. The imaging apparatus according to claim 4,
wherein the statistical unit calculates the statistics on the basis of any one of a mean of the distance values in the first area, a mode of the distance values in the first area, and a distance value of a flat surface in the first area among the distance values of the plurality of points.

6. The imaging apparatus according to claim 1,
wherein the contrast evaluation value calculation unit evaluates contrast in the second area that has a focus point corresponding to an input command or the vicinity of the focus point as a center.

7. The imaging apparatus according to claim 1, further comprising:
an area determination unit that determines an exclusion area to be excluded from the second area in the first area on the basis of the distance values of the plurality of points in the first area.

8. The imaging apparatus according to claim 1, further comprising:
an imaging direction control unit that controls an imaging direction of the imaging unit to at least one of a pan direction, a tilt direction, or a roll direction,
wherein the imaging direction control unit controls the imaging direction of the imaging unit on the basis of the focus point.

9. The imaging apparatus according to claim 1,
wherein the distance measurement unit is a stereo camera that performs distance measurement using a stereo image or an optical distance measurement device that performs distance measurement using light.

10. The imaging apparatus according to claim 1,
wherein the imaging unit captures an image of a structure to be inspected, and an input command indicating a main inspection portion of the structure to be inspected as the focus point is received.

11. A focus control method comprising:

a step of measuring distance values of a plurality of points in a first area which is in an image of an object captured by an imaging unit through an optical system including a focus lens and has a focus point as a reference point;

a step of calculating statistics indicating a variation in the measured distance values of the plurality of points in the first area;

a step of determining a size of a second area which is used to calculate a contrast evaluation value in the image and has the focus point as a reference point, on the basis of the calculated statistics;

a step of calculating the contrast evaluation value at each of a plurality of lens positions, on the basis of an image of the second area in an image captured by moving the focus lens to each of the plurality of lens positions; and a step of moving the focus lens to a lens position determined on the basis of the calculated contrast evaluation value.

* * * * *